US012547600B2

(12) United States Patent
Saimani et al.

(10) Patent No.: US 12,547,600 B2
(45) Date of Patent: Feb. 10, 2026

(54) SYSTEM AND METHOD FOR MANAGING CUSTOM FIELDS

(71) Applicant: Intuit Inc., Mountain View, CA (US)

(72) Inventors: Jayanth Saimani, Bangalore (IN); Kiran Kumar Shivanandan, Bangalore (IN); Prabhat Hegde, Bangalore (IN)

(73) Assignee: Intuit Inc., Mountain View, CA (US)

( * ) Notice: Subject to any disclaimer, the term of this patent is extended or adjusted under 35 U.S.C. 154(b) by 745 days.

(21) Appl. No.: 16/950,440

(22) Filed: Nov. 17, 2020

(65) Prior Publication Data

US 2022/0156245 A1    May 19, 2022

(51) Int. Cl.
*G06F 16/22*    (2019.01)
*G06F 16/21*    (2019.01)
*G06N 20/00*    (2019.01)

(52) U.S. Cl.
CPC ........ *G06F 16/2291* (2019.01); *G06F 16/213* (2019.01); *G06F 16/2272* (2019.01); *G06N 20/00* (2019.01)

(58) Field of Classification Search
CPC ............... G06F 16/2291; G06F 16/213; G06F 16/2272; G06F 16/211; G06N 20/00; G06N 3/0464; G06N 3/045; G06N 5/01; G06N 20/20
See application file for complete search history.

(56) References Cited

U.S. PATENT DOCUMENTS

| 7,801,886 B1 * | 9/2010 | Gabriel ................... G06F 16/20 707/715 |
| 8,386,953 B1 * | 2/2013 | Young ................... G06F 16/242 715/810 |
| 9,378,226 B1 * | 6/2016 | Wu ........................ G06F 16/211 |
| 2008/0126333 A1 * | 5/2008 | Bezar ..................... G06F 16/275 707/999.005 |
| 2016/0306887 A1 * | 10/2016 | Li .......................... G06F 16/954 |
| 2018/0089561 A1 * | 3/2018 | Oliner ..................... G06F 16/26 |

OTHER PUBLICATIONS

"Create Custom Fields", <https://help.salesforce.com/articleView?id=adding_fields.htm&type=0>, Mar. 1, 2017, 3 pages.
Fowler, M., "Dealing with Properties", Jan. 1, 1997, 18 pages.

* cited by examiner

*Primary Examiner* — Apu M Mofiz
*Assistant Examiner* — Oscar Wehovz
(74) *Attorney, Agent, or Firm* — Lathrop GPM LLP (57) ABSTRACT

A method may include obtaining a table including a table schema including definitions of native fields, adding a value of a custom field to the table by inserting, in a native field, a native field value including (i) an identifier (ID) of the custom field and (ii) the value of the custom field, and storing a definition of the custom field in a custom field registry external to the table. The custom field may be undefined by the table schema. The method may further include receiving a request to perform an operation on the table, generating, from the request, a query on a subset of the native fields and the custom field, executing the query to obtain query results, and transmitting, in response to the request, the query results.

17 Claims, 7 Drawing Sheets

Report Including a Custom Field 350

Craig's Landscaping and Design
SALES BY CUSTOMER DETAIL
January 1-30, 2020

| DATE | TRANSACTION TYPE | NUM | PRODUCT/SERVICE | MEMO/DESCRIPTION | QTY | SALES PRICE | AMOUNT |
|---|---|---|---|---|---|---|---|
| ▼ David | | | 352A Sales Rep Custom Field Value A | | | | |
| 01/09/20 | Invoice | 614 | Gardening | Weekly Gardening Services | 1.00 | 50.00 | 50.00 |
| Total for David | | | | | | | $50.00 |
| ▼ Travis | | | 352B Sales Rep Custom Field Value B | | | | |
| 01/09/20 | Invoice | 615 | Design | Design of landscape design | 1.00 | 55.00 | 55.00 |
| Total for Travis | | | | | | | $55.00 |
| TOTAL | | | | | | | $105.00 |

SYSTEM AND METHOD FOR MANAGING CUSTOM FIELDS

BACKGROUND

Custom fields are defined by users or system developers to extend definitions of entities (e.g., tables) used in computer programs without writing code, and may be released independently of any computer program. Custom fields are a way of adding structure to what had previously been unstructured information. For example, a sales representative custom field may be added to a transaction entity such that operations (e.g., operations that access or modify data) performed on the transaction entity also include the custom field. Conventional implementations of custom fields may incur a performance overhead when performing operations on entities with custom fields. In addition, integrating the behavior of multiple computer programs that use the same custom field may require additional programming effort.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a table including a table schema including definitions of native fields, adding a value of a custom field to the table by inserting, in a native field, a native field value including (i) an identifier (ID) of the custom field and (ii) the value of the custom field, and storing a definition of the custom field in a custom field registry external to the table. The custom field is undefined by the table schema. The method further includes receiving a request to perform an operation on the table, generating, from the request, a query on a subset of the native fields and the custom field, executing the query to obtain query results, and transmitting, in response to the request, the query results.

In general, in one aspect, one or more embodiments relate to a system including a computer processor, a repository configured to store a table including a table schema including definitions of native fields, and a computer program executing on a user computing system and configured to add a value of a custom field to the table by inserting, in a native field, a native field value including (i) an identifier (ID) of the custom field and (ii) the value of the custom field, and store a definition of the custom field in a custom field registry external to the table. The custom field is undefined by the table schema. The system further includes a customized table service executing on the computer processor and configured to receive a request to perform an operation on the table, generate, from the request, a query on a subset of the native fields and the custom field, executing the query to obtain query results, and transmit, in response to the request, the query results.

In general, in one aspect, one or more embodiments relate to a method including obtaining a table including a table schema including definitions of native fields, receiving, from a user and via a graphical user interface (GUI), an identifier (ID) of a custom field, a value of the custom field, and a definition of the custom field, adding the value of the custom field to the table by inserting, in a native field, a native field value including (i) the ID of the custom field and (ii) the value of the custom field, and storing the definition of the custom field in a custom field registry external to the table. The custom field is undefined by the table schema. The method further includes receiving, from the user and via the GUI, a request to perform an operation on the table, and sending the request to a customized table service configured to generate, from the request, a query on a subset of the native fields and the custom field, execute the query to obtain query results, and transmit, to the user via the GUI and in response to the request, the query results. The method further includes receiving, from the customized table service and via the GUI, the query results.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Although custom fields defined by users or system developers permit useful customization of table definitions used in computer programs, conventional implementations of custom fields may incur a performance overhead when performing operations on tables with custom fields. Furthermore, integrating the behavior of multiple computer programs that use the same custom field may require additional programming effort.

This disclosure provides a new capability for managing custom fields. Pairs of custom field identifiers (IDs) and custom field values may be stored within a value of a native field of a table. A native field is defined by a table schema for the table. In contrast, custom fields are undefined by the table schema for the table. Thus, custom fields may be added to the table without modifying the structure (e.g., the schema) of the table. In one or more embodiments, the pairs of custom field IDs and custom field values are represented using a non-relational format, such as JavaScript Object Notation (JSON). For example, the custom field values may be queried (e.g., via Structured Query Language (SQL) queries) using JSON dot notation, which simplifies access to data represented in the JSON format.

Custom field definitions may be stored in a custom field registry external to the tables that include the values of the custom fields. Storing custom field definitions in a separate custom field registry facilitates use and integration of custom fields by multiple computer programs. Storing custom field values directly in a native field of a table enables operations on tables that include custom fields to be performed efficiently using information stored in the table, without using information external to the table. For example, the operations on tables may generate reports, searches, and/or printouts.

Thus, the disclosed invention enables custom fields to be added to tables while enabling operations on tables that include custom fields to be performed efficiently, in addition to seamlessly integrating the behavior of multiple computer programs that use the same custom field. As a result, user satisfaction may be improved, potentially resulting in increased product engagement, positive customer ratings, and an increased sales.

Figure 1:
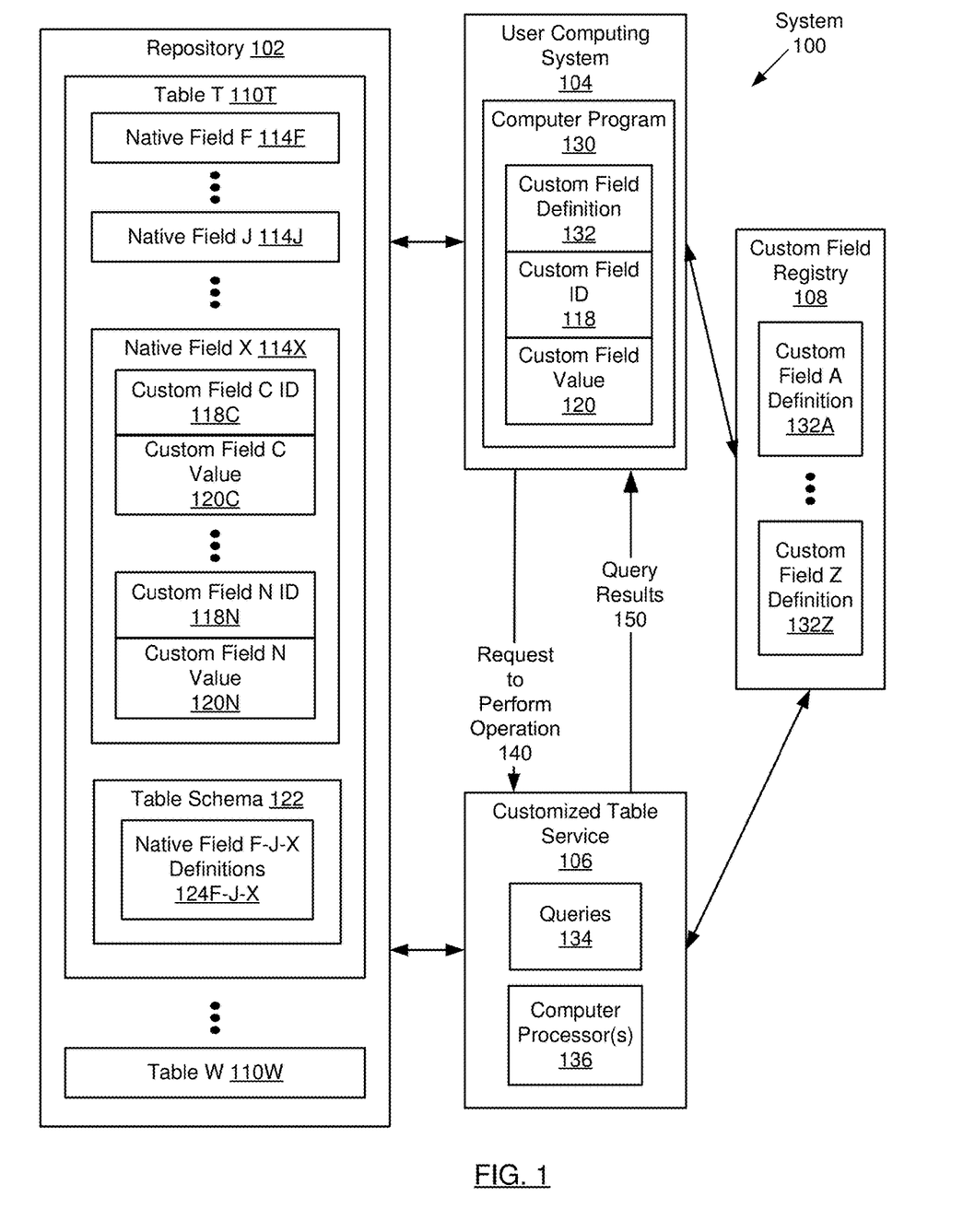
FIG. 1 shows a system in accordance with one or more embodiments of the invention.

FIG. 1 shows a diagram of a system (100) in accordance with one or more embodiments. As shown in FIG. 1, the system (100) includes multiple components such as the repository (102), a user computing system (104), a customized table service (106), and a custom field registry (108). Each of these components is described below.

The repository (102) is any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. The repository (102) may be accessed online via a cloud service (e.g., Amazon Web Services (AWS), Egnyte, Azure, etc.).

The repository (102) includes functionality to store tables (110T, 110W). A table (110T) is a structure that represents information in terms of rows (e.g., records) and columns (e.g., fields). Each row may include values corresponding to native fields (114F, 114J, 114X). Each native field (114F) may have an identifier (ID) (e.g., a name) and a value. A native field (114F) is a field of the table (110T) that is defined by a table schema (122) for the table (110T). The table schema (122) is an organizational structure for the table (110T) that includes native field definitions (124F-J-X) of the native fields (114F, 114J, 114X). The native field definitions (124F-J-X) describe various properties of the native fields (114F, 114J, 114X). A native field definition (124F) may include one or more of the following of the non-limiting list:

1) constraints on a value of the corresponding native field (114F). For example, a constraint may indicate specific valid values and/or a default value for the corresponding native field (114F) or a validation rule to be applied to values for the corresponding native field (114F). As another example, a constraint may be a type constraint (e.g., indicating an integer type, string type, date type, etc.). As yet another example, a constraint may indicate a regular expression to which the value of the native field is required to conform;

2) attributes of the corresponding native field (114F). For example, an attribute may indicate which operations (e.g., search, report, print) may be performed on the corresponding native field (114F); and/or
3) whether the corresponding native field (114F) is required or optional.

Custom fields may be added to a table (110T) to satisfy requirements of a user of a computer program (130). Alternatively, custom fields may be added to a table (110T) to satisfy requirements of a developer of the computer program (130). In contrast to native fields, custom fields are undefined by the table schema (122) for the table (110T). Information describing one or more custom fields may be stored within a value of a native field. For example, FIG. 1 shows that information describing one or more custom fields may be stored within a value of native field X (114X). Continuing this example, information describing one or more custom fields may be represented as one or more pairs of custom field identifiers (IDs) (118C, 118N) and custom field values (120C, 120N). A custom field ID (118C) may be a name or other identifier of the custom field. A custom field value (120C) is a value of the custom field. For example, the custom field ID (118C) of a custom field may be "job" and the custom field value (120C) may be "engineer". In one or more embodiments, the custom field value (120C) is a collection of values. For example, the custom field value (120C) may be a collection of ID:value pairs. Continuing this example, the custom field ID (118C) may be "address" and the custom field value (120C) may be "street: main street", "city: rock creek", "zip code: 99999", etc.

In one or more embodiments, the pairs of custom field IDs (118C, 118N) and custom field values (120C, 120N) are represented using a non-relational format, such as JavaScript Object Notation (JSON). For example, the custom field values (120C, 120N) may be queried (e.g., via Structured Query Language (SQL) queries) using JSON dot notation, which simplifies access to data represented in the JSON format. Continuing this example, a custom field whose custom field ID is "job" in an Employees table may be queried using the following expression in JSON dot notation: Employees.CustomFields.job, where "CustomFields" is an identifier of a native field that stores information about the custom field. Further continuing this example, a native field (114X) in which pairs of custom field IDs (118C, 118N) and custom field values (120C, 120N) are stored may permit storage of values of a large object type (LOB) or character large object type (CLOB) (e.g., in an Oracle database).

Custom field definitions (132A, 132Z) may be stored in the custom field registry (108). That is, custom field definitions (132A, 132Z) may be stored separately from (e.g., external to) the tables (110T, 110W) that include the values of the custom fields corresponding to the custom field definitions (132A, 132Z). For example, custom field definitions (132A, 132Z) may be stored external to the table schemas (122) of the tables (110T, 110W) that include the values of the custom fields. Storing custom field definitions (132A, 132Z) in the separate custom field registry (108) facilitates consistent use and integration of custom fields (118C, 118N) across multiple computer programs (130). Storing custom field values (120C, 120N) directly in a table (110T) (e.g., in a native field (114X) of a table (110T)) enables operations on tables that include custom fields to be performed using information stored in the table (110T) (e.g., without using information external to the table (110T)). For example, the operations performed on custom fields may be "CRUD" operations that create, read, update, or delete a custom field value (120C). The custom field definitions (132A, 132Z) may describe various properties of the custom fields. Custom field definitions (132A, 132Z) may include one or more of the aforementioned list of items included in a native field definition (124F).

In one or more embodiments, the user computing system (104) provides, to a user, a variety of computing functionality. For example, the computing functionality may include word processing, multimedia processing, financial management, business management, social network connectivity, network management, and/or various other functions that a computing device performs for a user. The user may be a small business owner. Alternatively, the user may be a company employee that acts as a sender, a potential sender, or a requestor of services performed by a company (e.g., a client, a customer, etc.) of the user computing system. The user computing system (104) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (104) may take the form of the computing system (400) shown in FIG. 4A connected to a network (420) as shown in FIG. 4B.

The user computing system (104) includes a computer program (130) in accordance with one or more embodiments. The computer program (130), in accordance with one or more embodiments, is a software application written in any programming language that includes executable instructions stored in some sort of memory. The instructions, when executed by one or more processors, enable a device to perform the functions described in accordance with one or more embodiments. The computer program (130) may include a user interface (UI) (not shown) for receiving input from a user and transmitting output to the user. For example, the UI may be a graphical user interface or other user interface. The UI may be rendered and displayed within a local desktop software application or the UI may be generated by a remote web server and transmitted to a user's web browser executing locally on a desktop or mobile device. In one or more embodiments, the UI includes functionality to receive a custom field definition (132), a custom field ID (118), and/or a custom field value (120) from a user.

The computer program (130) includes functionality to send a request to perform an operation (140) to the customized table service (106). For example, the operation may conduct a search of a table (110T), generate a report or printout from the table (110T), etc.

In one or more embodiments, the computer program (130) includes functionality to apply a trained machine learning model to recommend a custom field ID to a user based on the custom field IDs used by other users of the computer program (130). The IDs of custom fields used by users of the computer program (130) may be stored in user profiles that are stored in the repository (102). The user profiles may further include attributes of the users of the computer program (130). For example, the attributes may include one or more of the following for small business users of the computer program: industry code (e.g., North American Industry Classification System (NAICS) code or Merchant Category Code (MCC)), category of product or service provided by the user, number of employees, monthly sales volume, company age in years, etc. The machine learning model may be trained to learn the correlation of user attributes to the custom field IDs used by various users of the computer program (130). Continuing this example, the machine learning model may generate scores for IDs of custom fields using the attributes of the users.

The machine learning model may be implemented as various types of deep learning classifiers such as a neural network classifier (e.g., based on convolutional neural networks (CNNs)), random forest classifier, SGD classifier, lasso classifier, gradient boosting classifier, bagging classifier, ada boost classifier, ridge classifier, elastic net classifier, or NuSVR classifier. Deep learning, also known as deep structured learning or hierarchical learning, is part of a broader family of machine learning methods based on learning data representations, as opposed to task-specific algorithms.

Figure 4A:
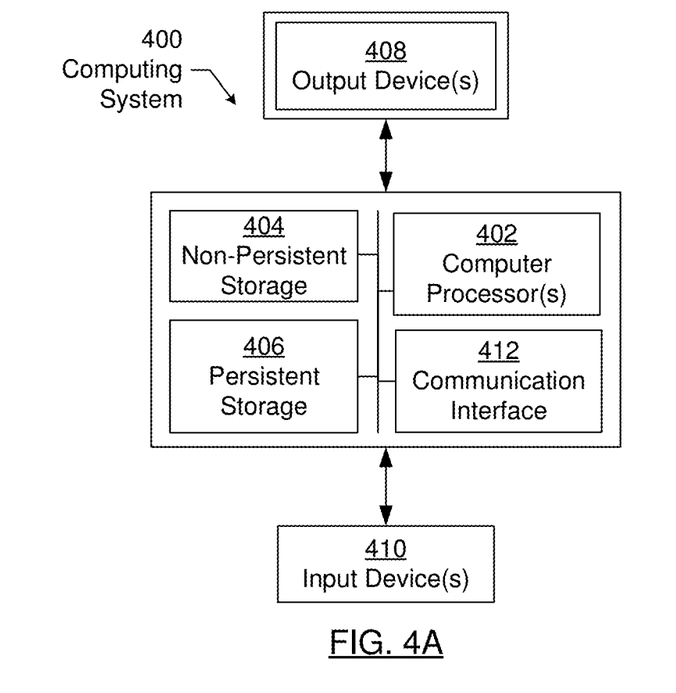
FIG. 4A and FIG. 4B show computing systems in accordance with one or more embodiments of the invention.
Figure 4B:
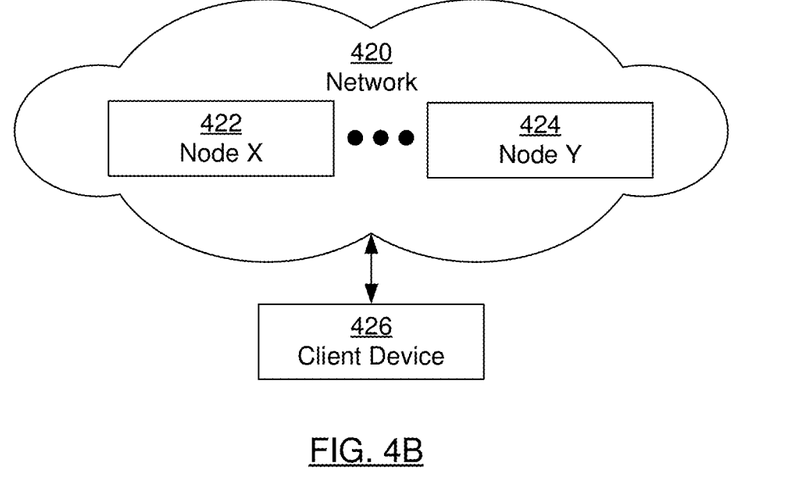

The customized table service (106) may be executed on a computing system (e.g., the computing system (400) of FIG. 4A connected to a network (420) as shown in FIG. 4B). The customized table service (106) includes functionality to perform various operations on tables (110T, 110W). The customized table service (106) may perform an operation on a table (110T) in response to a request to perform an operation (140) received from a computer program (130). The customized table service (106) includes functionality to transmit query results (150) to a computer program (130) in response to receiving the request to perform an operation (140). The customized table service (106) includes functionality to generate and/or execute queries (134) on one or more native fields (114F, 114J, 114X). The customized table service (106) may include computer processor(s) (136). In one or more embodiments, the computer processor(s) (136) takes the form of the computer processor(s) (402) described with respect to FIG. 4A and the accompanying description below.

While FIG. 1 shows a configuration of components, other configurations may be used without departing from the scope of the invention. For example, various components may be combined to create a single component. As another example, the functionality performed by a single component may be performed by two or more components.

Figure 2A:
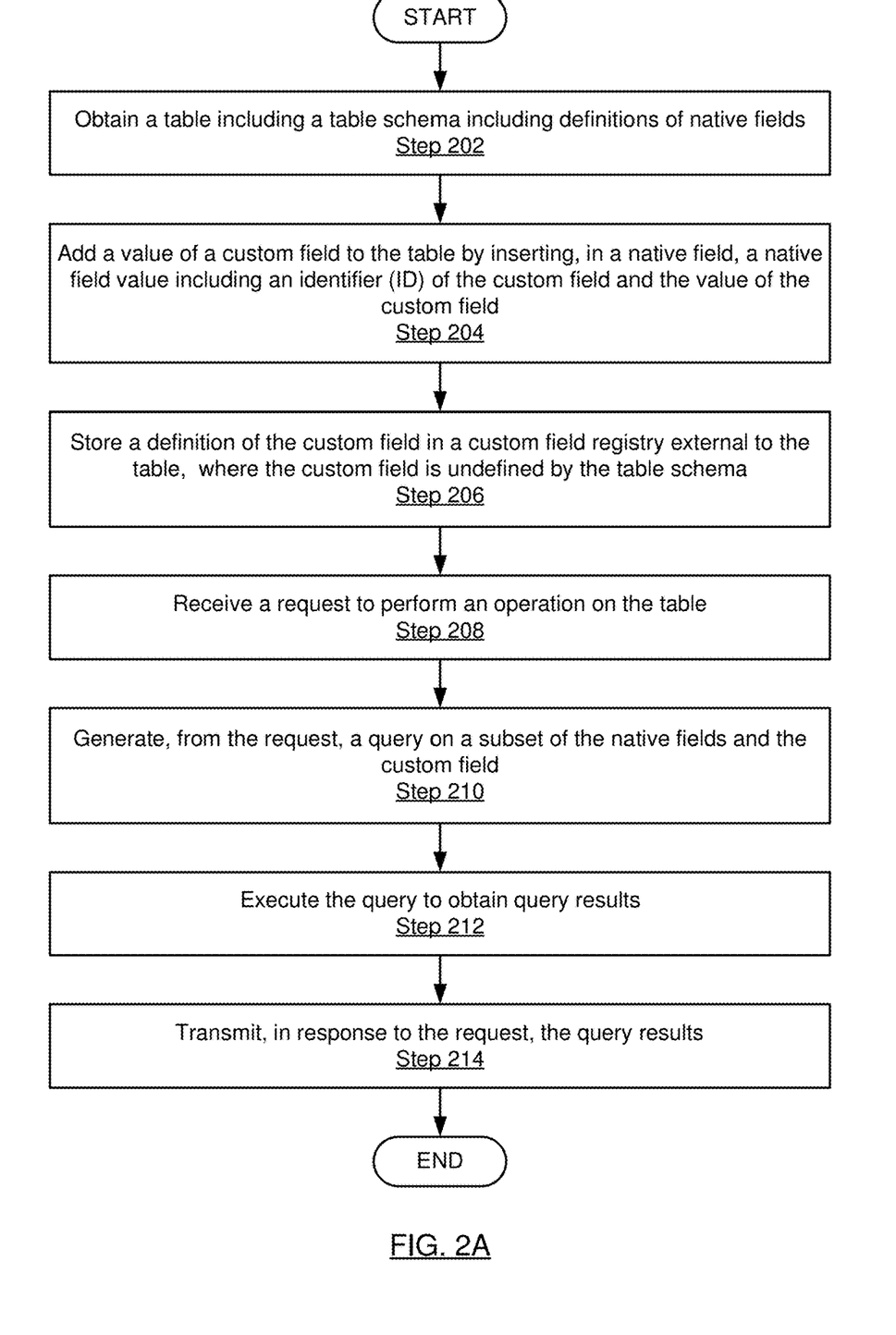
FIG. 2A and FIG. 2B show flowcharts in accordance with one or more embodiments of the invention.

FIG. 2A shows a flowchart in accordance with one or more embodiments of the invention. The flowchart depicts a process for process for managing custom fields. One or more of the steps in FIG. 2A may be performed by the components (e.g., the customized table service (106) and the computer program (104) of the system (100)), discussed above in reference to FIG. 1. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, a table including a table schema that includes definitions of native fields stored is obtained. The computer program may obtain the table from a repository.

In Step 204, a value of a custom field is added to the table. The computer program may add the value of the custom field to the table by inserting, in a native field, a native field value including (i) an identifier (ID) of the custom field and (ii) the value of the custom field. Thus, the custom field may be added to the table without modifying the structure (e.g., without modifying the table schema) of the table, because the custom field may be stored within the value of an already-existing native field of the table. The computer program may add the value of the custom field to the table via a call to an application programming interface (API) of the repository. The computer program may receive the ID of the custom field and/or the value of the custom field from a user via a graphical user interface (GUI) of the computer program.

In Step 206, a definition of the custom field is stored in a custom field registry external to the table. The computer program may store the definition of the custom field in the custom field registry. In one or more embodiments, the custom field is undefined by the table schema. The computer program may receive the definition of the custom field from the user via the GUI of the computer program. Alternatively, the computer program may receive the definition of the custom field from a developer.

The computer program may validate the received value using the definition of the custom field. For example, the definition of the custom field may include a validation rule indicating specific valid values and/or a type constraint for values of the custom field. The computer program may obtain the definition of the custom field from the custom field registry. For example, the computer program may obtain the definition of the custom field from the custom field registry by querying the custom field registry with the ID of the custom field.

The computer program may receive a request to import, into the table, one or more values of the custom field from another table. In response to receiving the request to import the value of the custom field, the computer program may obtain, from the other table, the one or more values of the custom field. For example, the one or more values of the custom field may be obtained from the other table by querying the other table with the ID of the custom field. Continuing this example, values of a "sales rep" custom field in a transaction table may be imported into an invoice table. Alternatively, the customized table service may receive the request to import, into the table, one or more values of the custom field from another table.

The computer program may recommend a custom field to the user. In one or more embodiments, the computer program recommends an identifier (ID) of the recommended custom field to the user based on detecting a recurring token in the values of an unstructured native field (e.g., a text field) of the table. For example, the recurring token may be a series of one or more words. Continuing this example, the recurring token may be "shipment code" and the unstructured native field may be a "notes" field. The computer program may recommend the ID of the custom field to the user based on detecting that the number of occurrences of the recurring token exceeds a threshold value.

In one or more embodiments, the computer program recommends, using a trained machine learning model, an identifier (ID) of a custom field to the user based on the IDs of custom fields used by other users of the computer program, as well as attributes of the other users of the computer program. That is, the machine learning model may be trained to learn the correlation of user attributes to the custom field IDs used by various users of the computer program. The computer program may obtain the user attributes and the IDs of custom fields used by various users of the computer program from user profiles stored in a repository. The computer program may recommend, to the user, the IDs of one or more custom fields corresponding to scores exceeding a threshold.

In Step 208, a request to perform an operation on the table is received. For example, the operation may be to conduct a search of the table, generate a report or printout from the table, etc. Continuing this example, the operation may specify that the report group data of the table using the values of the custom field. As another example, the operation may conduct a search of the table using the values of the custom field. The customized table service may receive the request from the computer program. For example, the request may be received by the customized table service from the computer program in response to a command entered by a user via a GUI of the computer program.

In Step 210, a query on the native fields and the custom field is generated from the request. That is, the request to perform the operation may be implemented using (e.g., converted to) a query on the native fields and the custom field. For example, the query may be a relational query (e.g., a Structured Query Language (SQL) query) that accesses both the native fields and the custom field. Continuing this example, when the custom field is represented using the JSON format, the relational query may access the custom field using JSON dot notation.

In one or more embodiments, the customized table service may exclude the custom field from the query. For example, the customized table service may exclude the custom field from the query based on determining that the operation specified in the request received in Step 208 above does not apply to the custom field. Continuing this example, the operation specified in the request may be "report", and the definition of the custom field may include an "allowed operations" attribute that does not list the "report" operation. As another example, the definition of the custom field may include an "access control list" attribute that does not include the user submitting the request in Step 208.

In Step 212, the query is executed to obtain query results. The customized table service may execute the query by accessing the values of the native fields and the custom field. Thus, the customized table service may execute the query without accessing information external to the table. The customized table service may convert the query results to a response. For example, the query results may be converted to a printable format when the operation specified in the request received in Step 208 above is "print". As another example, the query results may be converted to a displayable format when the operation displays a report generated from the table on a display device utilized by the computer program.

In Step 214, the query results are transmitted in response to the request. The customized table service may transmit the query results to the computer program.

Figure 2B:
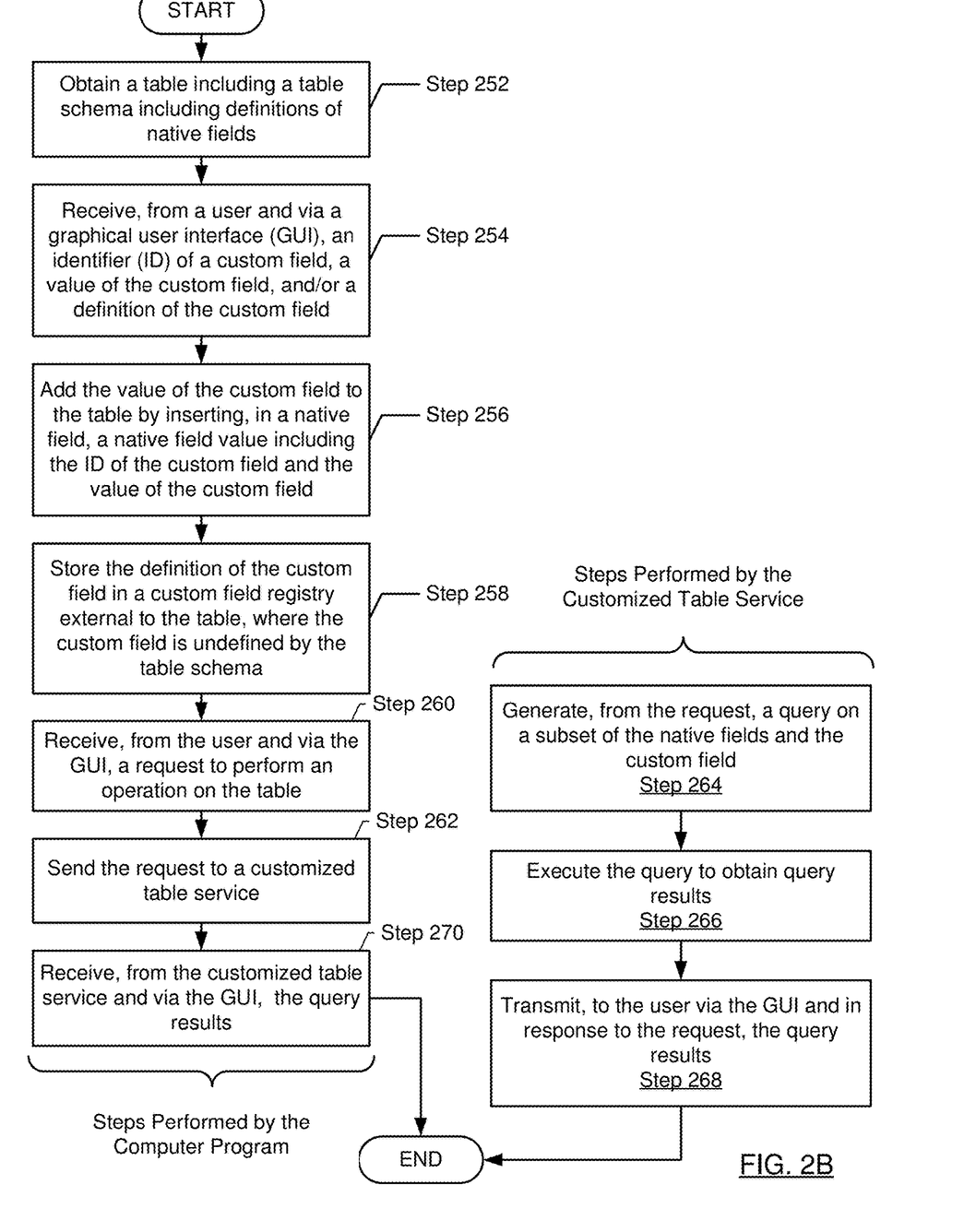

FIG. 2B shows a flowchart in accordance with one or more embodiments of the invention. The flowchart depicts a process for process for managing custom fields. One or more of the steps in FIG. 2B may be performed by the components (e.g., the customized table service (106) and the computer program (104) of the system (100)), discussed above in reference to FIG. 1. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, a table including a table schema that includes definitions of native fields stored is obtained (see description of Step 202 above).

In Step 254, an identifier (ID) of a custom field, a value of the custom field, and/or a definition of the custom field are received from a user via a graphical user interface (GUI). The GUI may be a GUI of a computer program.

In Step 256, a value of the custom field is added to the table (see description of Step 204 above).

In Step 258, the definition of the custom field is stored in a custom field registry external to the table (see description of Step 206 above).

In Step 260, a request to perform an operation on the table is received from the user via the GUI (see description of Step 208 above).

In Step 262, the request to perform the operation on the table is sent to a customized table service. The request may be sent to the customized table service by the computer program over a network.

In Step 264, a query on the native fields and the custom field is generated from the request (see description of Step 210 above).

In Step 266, the query is executed to obtain query results (see description of Step 212 above).

In Step 268, the query results are transmitted to the user via the GUI in response to the request. The request may be transmitted to the computer program by the customized table service over a network.

In Step 270, the query results are received from the customized table service via the GUI. The computer program may display the query results via an element within the GUI. In one or more embodiments, the element (e.g., a widget) is generated by a computer processor and rendered within the GUI.

Figure 3A:
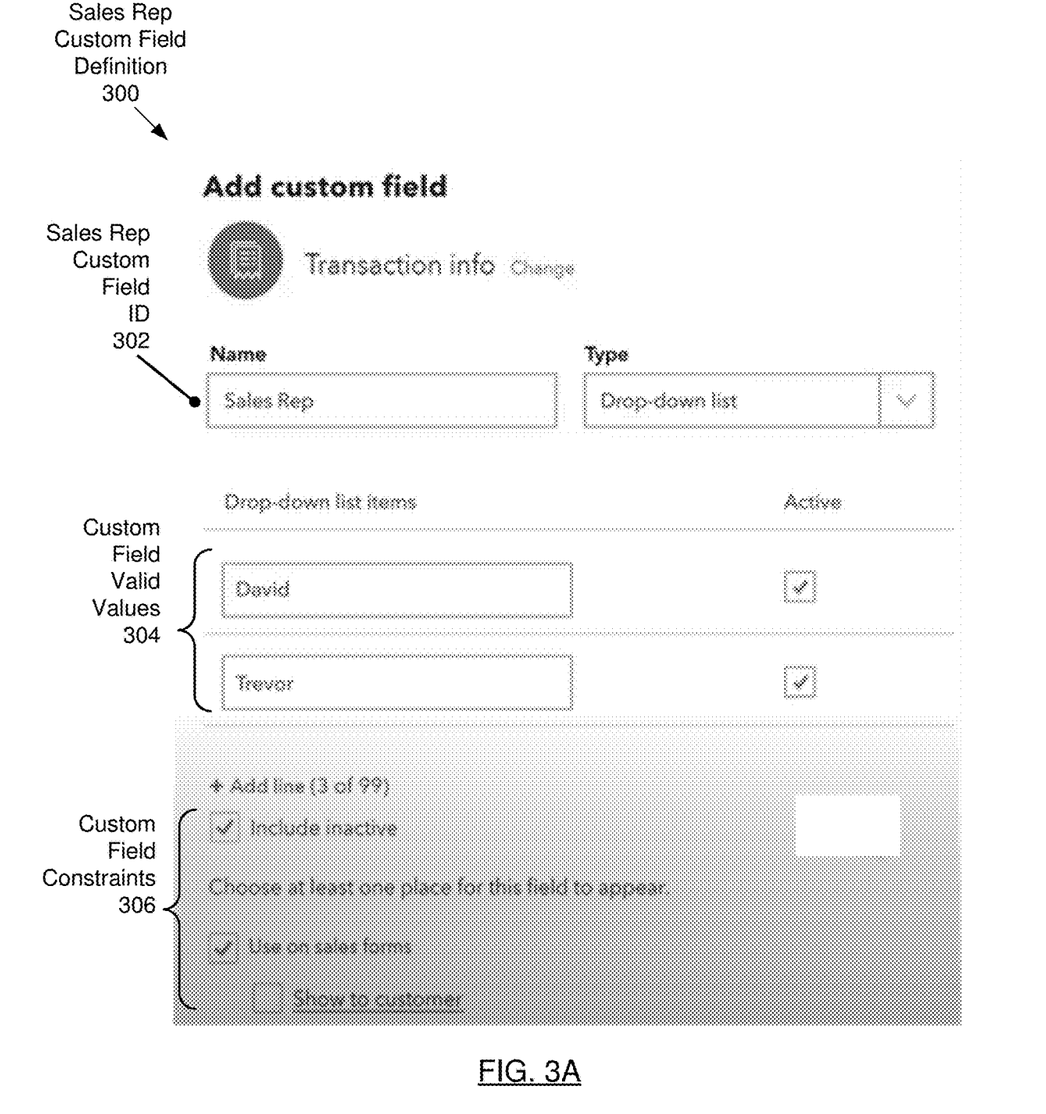
FIG. 3A, FIG. 3B, and FIG. 3C show examples in accordance with one or more embodiments of the invention.
Figure 3B:
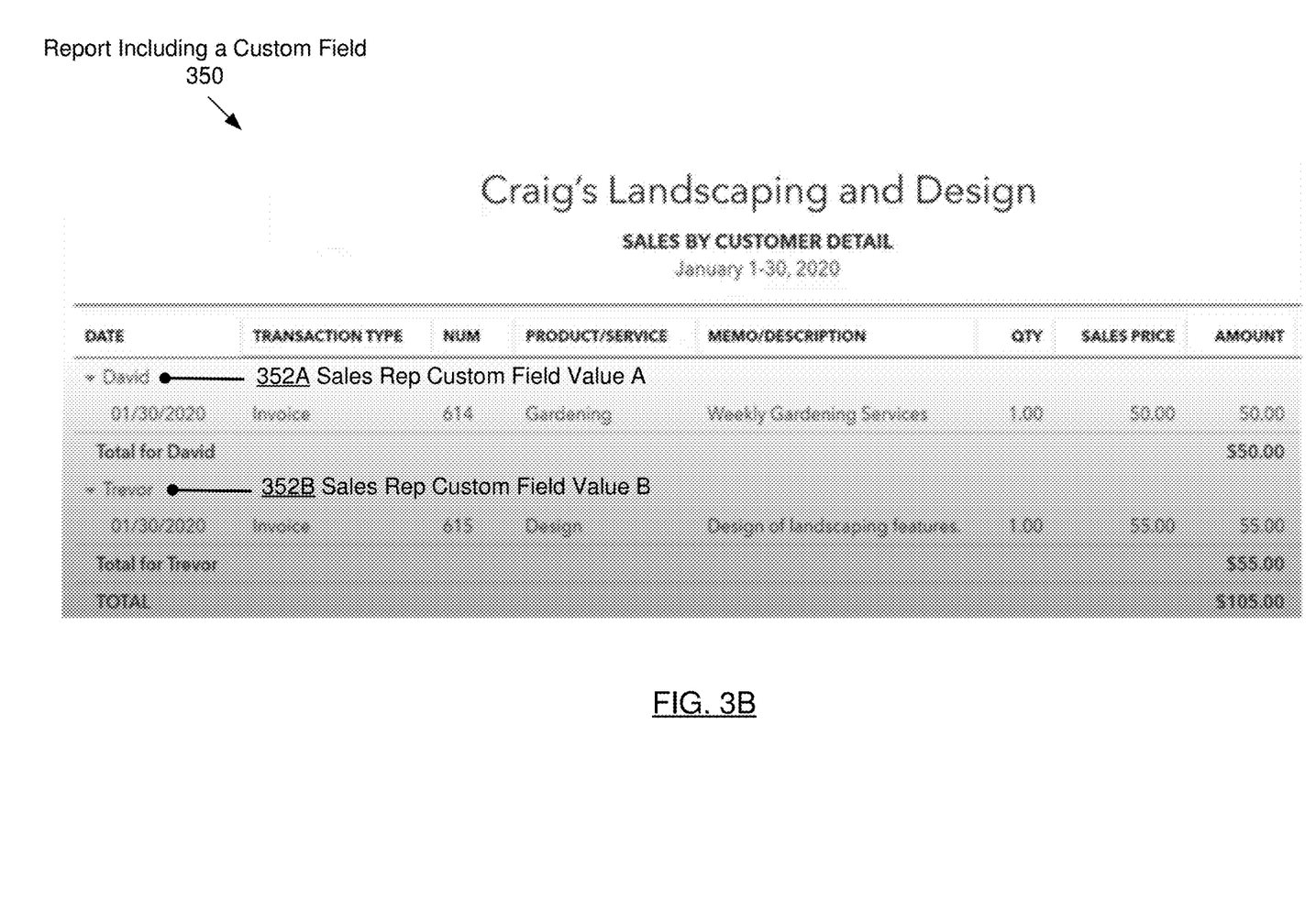
Figure 3C:
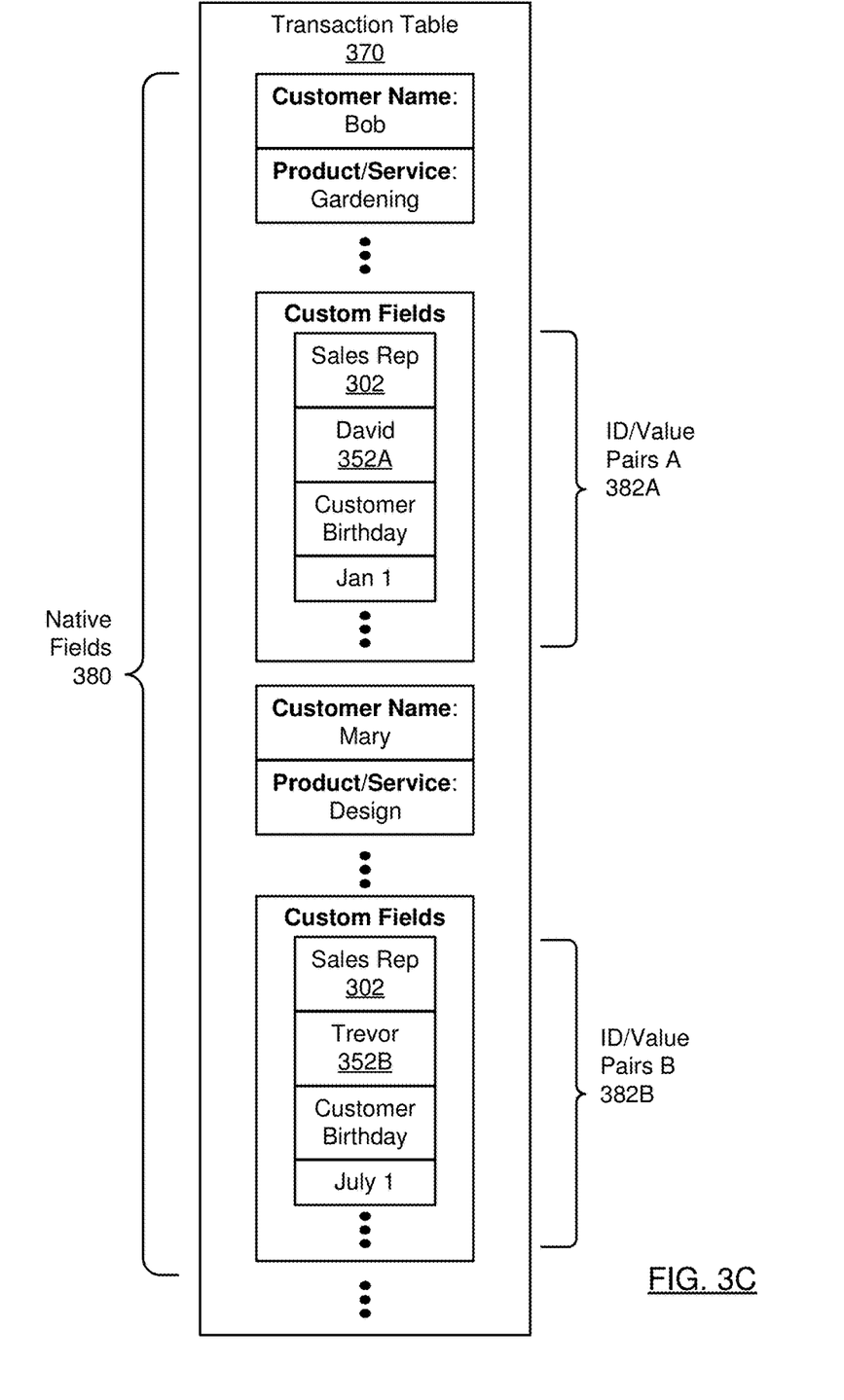

The following example is for explanatory purposes only and not intended to limit the scope of the invention. FIG. 3A, FIG. 3B, and FIG. 3C show an implementation example in accordance with one or more embodiments of the invention. FIG. 3A shows a Sales Rep custom field definition (300) ((132, 132A, 132Z) in FIG. 1) for a custom field being added to a Transaction table by a small business user via a graphical user interface (GUI) of a computer program, in this case a financial management computer program. The user enters the Sales Rep custom field ID (302) ((118, 118C, 118N) in FIG. 1) into the GUI. The user also enters custom field valid values (304) (e.g., names of sales representatives) as part of the Sales Rep custom field definition (300). The GUI displays the custom field valid values (304) when a user selects a drop-down list of valid values of the Sales Rep custom field during data entry into the Transaction table. The user also selects custom field constraints (306) as part of the Sales Rep custom field definition (300). The custom field constraints (306) indicate that inactive sales representatives may be included in the drop-down list, and that the Sales Rep custom field is to be used on sales form, but not shown to customers. For example, the Sales Rep custom field may be excluded from reports, searches, and/or printouts of the transaction table provided to customers.

FIG. 3B shows a report including a custom field (350) generated by the customized table service for the Transaction table, which now includes the Sales Rep custom field. The records included in the report are grouped by Sales Rep custom field values (352A, 352B), which are the names of the sales representatives.

FIG. 3C shows the native fields (380) ((114F, 114J, 114X) in FIG. 1) of the Transaction table (370) ((110T, 110W) in FIG. 1). The native fields (380) include a Customer Name native field, a Product/Service native field, and a Custom Fields native field. Each value of the Custom Fields native field includes a custom field ID/custom field value pair for each custom field added to the Transaction table (370). In this case, the Transaction table (370) includes two custom fields: Sales Rep and Customer Birthday. The first record of the Transaction table (370) includes the following values for the native fields (380):
Customer Name: Bob
Product/Service: Gardening
Custom Fields: ID/Value Pairs A (382A), which includes
(i) the Sales Rep custom field ID (302) and the corresponding Sales Rep custom field value A "David" (352A), and (ii) the Customer Birthday field ID and the corresponding Customer Birthday custom field value "Jan 1". That is, the value of the Custom Fields native field includes an ID/Value Pair corresponding to each custom field (the Sales Rep and Customer Birthday custom fields) added to the Transaction table (370).

Similarly, the second record of the Transaction table (370) includes the following values for the native fields (380):
Customer Name: Mary
Product/Service: Design
Custom Fields: ID/Value Pairs B (382B), which includes
(i) the Sales Rep custom field ID (302) and corresponding Sales Rep custom field value B "Trevor" (352B), and (ii) the Customer Birthday field ID and corresponding Customer Birthday custom field value "July 1".

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
  obtaining a first table comprising a table schema comprising a plurality of definitions of a plurality of native fields;
  adding a first value of a first custom field to the first table by inserting, in a single native field of the plurality of native fields, a native field value comprising (i) an identifier (ID) of the first custom field and (ii) the first value of the first custom field;
  storing a definition of the first custom field in a custom field registry external to the first table, wherein the first custom field is undefined by the table schema;
  receiving a first request to perform a first operation on the first table;
  generating, from the first request, a first query on a first subset of the plurality of native fields and the first custom field;
  receiving a second request to import, into the first table, one or more values of the first custom field from a second table;

in response to receiving the second request:
    obtaining, from the custom field registry, the definition of the first custom field, and
    importing, into the first table and using the definition of the first custom field, the one or more values of the first custom field from the second table;
executing the first query to obtain query results; and
transmitting, in response to the first request, the query results.

2. The method of claim 1, further comprising:
adding a second value of a second custom field to the first table by adding, to the native field value of the native field, (i) an ID of the second custom field and (ii) the second value of the second custom field; and
storing a definition of the second custom field in the custom field registry,
wherein the second custom field is undefined by the table schema.

3. The method of claim 1, further comprising:
receiving, via a graphical user interface (GUI) of a computer program, a new value of the first custom field for the first table;
obtaining, from the custom field registry, the definition of the first custom field; and
validating, using the definition of the first custom field, the new value of the first custom field.

4. The method of claim 1, further comprising:
identifying a recurring token in a plurality of values of an unstructured field of the plurality of native fields;
detecting that a number of occurrences of the recurring token exceeds a threshold; and
in response to detecting that the number of occurrences of the recurring token exceeds the threshold, recommending the recurring token as an ID of a second custom field.

5. The method of claim 1, further comprising:
receiving a second request to perform a second operation on the first table;
obtaining, from the custom field registry, the definition of the first custom field; and
generating, from the second request and using the definition of the first custom field, a second query on a second subset of the plurality of native fields, wherein the first custom field is excluded from the second query.

6. The method of claim 1, further comprising:
obtaining a plurality of IDs of custom fields used by a plurality of users of a computer program, wherein the plurality of IDs of custom fields comprises the ID of the first custom field, wherein the plurality of users comprises a user, and wherein each of the plurality of users has a plurality of attributes;
calculating, by a trained machine learning model, for the user and the plurality of IDs of custom fields, a plurality of scores using the plurality of attributes of the plurality of users; and
recommending, to the user and using the plurality of scores, the ID of the first custom field, wherein the first value of the first custom field is added by the user to the first table in response to the recommending.

7. A system comprising:
a computer processor;
a repository configured to store a first table comprising a table schema comprising a plurality of definitions of a plurality of native fields;
a computer program executing on a user computing system and configured to:
    add a first value of a first custom field to the first table by inserting, in a single native field of the plurality of native fields, a native field value comprising (i) an identifier (ID) of the first custom field and (ii) the first value of the first custom field, and
    store a definition of the first custom field in a custom field registry external to the first table, wherein the first custom field is undefined by the table schema; and
a customized table service, executing on the computer processor and configured to:
    receive a first request to perform a first operation on the first table,
    generate, from the first request, a first query on a first subset of the plurality of native fields and the first custom field,
    receive a second request to import, into the first table, one or more values of the first custom field from a second table,
    in response to receiving the second request:
        obtain, from the custom field registry, the definition of the first custom field, and
        import, into the first table and using the definition of the first custom field, the one or more values of the first custom field from the second table, and
    execute the first query to obtain query results, and
    transmit, in response to the first request, the query results.

8. The system of claim 7, wherein the computer program is further configured to:
add a second value of a second custom field to the first table by adding, to the native field value of the native field, (i) an ID of the second custom field and (ii) the second value of the second custom field, and
store a definition of the second custom field in the custom field registry, wherein the second custom field is undefined by the table schema.

9. The system of claim 7,
wherein the computer program comprises a graphical user interface (GUI),
wherein the GUI is configured to receive, from a user, a new value of the first custom field for the first table, and
wherein the computer program is further configured to, in response to the GUI receiving the new value of the first custom field:
    obtain, from the custom field registry, the definition of the first custom field, and
    validate, using the definition of the first custom field, the new value of the first custom field.

10. The system of claim 7, wherein the computer program is further configured to:
identify a recurring token in a plurality of values of an unstructured field of the plurality of native fields,
detect that a number of occurrences of the recurring token exceeds a threshold, and
in response to detecting that the number of occurrences of the recurring token exceeds the threshold, recommend the recurring token as an ID of a second custom field.

11. The system of claim 7, wherein the customized table service is further configured to:
receive a second request to perform a second operation on the first table,
obtain, from the custom field registry, the definition of the first custom field, and
generate, from the second request and using the definition of the first custom field, a second query on a second subset of the plurality of native fields, wherein the first custom field is excluded from the second query.

12. The system of claim 7, wherein the computer program comprises a trained machine learning model, and wherein the computer program is further configured to:
obtain a plurality of IDs of custom fields used by a plurality of users of the computer program, wherein the plurality of IDs of custom fields comprises the ID of the first custom field, wherein the plurality of users comprises a user, and wherein each of the plurality of users has a plurality of attributes,
calculate, by the trained machine learning model, for the user and the plurality of IDs of custom fields, a plurality of scores using the plurality of attributes of the plurality of users, and
recommend, to the user and using the plurality of scores, the ID of the first custom field, wherein the first value of the first custom field is added by the user to the first table in response to the recommending.

13. A method comprising:
obtaining a first table comprising a table schema comprising a plurality of definitions of a plurality of native fields;
receiving, from a user and via a graphical user interface (GUI), an identifier (ID) of a first custom field, a first value of the first custom field, and a definition of the first custom field;
adding the first value of the first custom field to the first table by inserting, in a single native field of the plurality of native fields, a native field value comprising (i) the ID of the first custom field and (ii) the first value of the first custom field;
storing the definition of the first custom field in a custom field registry external to the first table, wherein the first custom field is undefined by the table schema;
receiving, from the user and via the GUI, a first request to perform a first operation on the first table; and
sending the first request to a customized table service configured to:
generate, from the first request, a first query on a first subset of the plurality of native fields and the first custom field,
execute the first query to obtain query results, and
transmit, to the user via the GUI and in response to the first request, the query results; and
receiving, from the user and via the GUI, a second request to import, into the first table, one or more values of the first custom field from a second table; and in response to receiving the second request:
obtaining, from the custom field registry, the definition of the first custom field, and
importing, into the first table and using the definition of the first custom field, the one or more values of the first custom field from the second table
receiving, from the customized table service and via the GUI, the query results.

14. The method of claim 13, further comprising:
receiving, from the user and via the GUI, an ID of a second custom field, a second value of the second custom field, and a definition of the second custom field;
adding the second value of the second custom field to the first table by adding, to the native field value of the native field, (i) the ID of the second custom field and (ii) the second value of the second custom field; and
storing the definition of the second custom field in the custom field registry,
wherein the second custom field is undefined by the table schema.

15. The method of claim 13, further comprising:
receiving, from the user and via the GUI, a new value of the first custom field for the first table;
obtaining, from the custom field registry, the definition of the first custom field; and
validating, using the definition of the first custom field, the new value of the first custom field.

16. The method of claim 13, further comprising:
identifying a recurring token in a plurality of values of an unstructured field of the plurality of native fields;
detecting that a number of occurrences of the recurring token exceeds a threshold; and
in response to detecting that the number of occurrences of the recurring token exceeds the threshold, recommending, to the user and via the GUI, the recurring token as an ID of a second custom field.

17. The method of claim 13, wherein the customized table service is further configured to:
receive a second request to perform a second operation on the first table;
obtain, from the custom field registry, the definition of the first custom field; and
generate, from the second request and using the definition of the first custom field, a second query on a second subset of the plurality of native fields, wherein the first custom field is excluded from the second query.

* * * * *